(12) United States Patent
Kirjavainen

(10) Patent No.: US 6,308,912 B1
(45) Date of Patent: Oct. 30, 2001

(54) ROTORCRAFT

(75) Inventor: Kari Kirjavainen, Espoo (FI)

(73) Assignee: Natural Colour Kari Kirjavainen Oy, Tampere (FI)

(*) Notice: Subject to any disclaimer, the term of this patent is extended or adjusted under 35 U.S.C. 154(b) by 0 days.

(21) Appl. No.: 09/529,936

(22) PCT Filed: Oct. 20, 1998

(86) PCT No.: PCT/FI98/00817

§ 371 Date: Apr. 21, 2000

§ 102(e) Date: Apr. 21, 2000

(87) PCT Pub. No.: WO99/20527

PCT Pub. Date: Apr. 29, 1999

(30) Foreign Application Priority Data

Oct. 21, 1997 (FI) .................................................. 974008 U

(51) Int. Cl.[7] ................................................. B64C 39/06

(52) U.S. Cl. ................ 244/12.2; 244/17.11; 244/23 C; 244/58

(58) Field of Search ...................... 244/13, 12.1, 12.2, 244/12.3, 23 R, 23 C, 17.11, 58, 53 R, 62; 416/146 R; 290/44, 55; 415/121.3

(56) References Cited

U.S. PATENT DOCUMENTS

| | | |
|---|---|---|
| 2,740,595 | 4/1956 | Bakewell . |
| 2,847,173 | 8/1958 | McCarty, Jr. . |
| 3,690,597 * | 9/1972 | Di Martino .................. 244/23 C |
| 3,722,830 | 3/1973 | Barber . |
| 3,774,865 * | 11/1973 | Pinto .................. 244/23 C |
| 3,985,320 * | 10/1976 | Brady .................. 244/12.2 |
| 4,032,084 * | 6/1977 | Black .................. 244/12.2 |
| 4,123,018 | 10/1978 | Tassin de Montaigu . |
| 4,296,892 * | 10/1981 | Barge .................. 244/12.2 |
| 4,415,133 * | 11/1983 | Phillips .................. 244/53 R |
| 4,697,761 * | 10/1987 | Long .................. 244/58 |
| 5,064,143 * | 11/1991 | Bucher .................. 244/12.2 |
| 5,072,892 * | 12/1991 | Carrington .................. 244/23 C |
| 5,810,284 * | 9/1998 | Hibbs et al. .................. 244/58 |

FOREIGN PATENT DOCUMENTS

| | | |
|---|---|---|
| 681 290 A5 | 2/1993 | (CH) . |
| 26 48 504 B1 | 2/1978 | (DE) . |
| 1 277 042 | 6/1972 | (GB) . |
| WO 87/02004 | 4/1987 | (WO) . |

* cited by examiner

Primary Examiner—Galen L. Barefoot
(74) Attorney, Agent, or Firm—Young & Thompson

(57) ABSTRACT

An aircraft having a frame (1) and at least a rotor (2a, 2b) for providing lift for the aircraft. The aircraft comprises elements for accommodation purposes. Furthermore, solar cells (5) are arranged on the aircraft for exploiting solar energy, and the rotor (2a, 2b) comprises elements for adjusting the rotor (2a, 2b) to exploit wind energy when the aircraft is substantially stationary.

9 Claims, 3 Drawing Sheets

ROTORCRAFT

CROSS REFERENCE TO RELATED APPLICATION

This is the 35 USC 371 national stage of international application PCT/FI98/00817 filed on Oct. 20, 1998, which designated the United States of America.

FIELD OF THE INVENTION

The invention relates to an aircraft having a frame and at least a rotor for providing lift for the aircraft.

SUMMARY OF THE INVENTION

Publications FI-49949, DE-2 648 504, U.S. Pat. Nos. 2,740, 595, 4,123,018, WO-87/02004, U.S. Pat. Nos. 2,847, 173 and 3,722,830 disclose various aircraft of a helicopter type. The aircraft disclosed in the publications are not versatile enough and they consume plenty of fuel.

An object of the present invention is to provide an aircraft in which the above-described disadvantages can be avoided.

The aircraft of the invention is characterized in that it provides a means for accommodation purposes, that solar cells are arranged on the aircraft for exploiting solar energy and that in connection with the rotor, means are provided for exploiting wind energy by means of the rotor.

It is an essential idea of the invention that the aircraft is adapted for moving and accommodation purposes and comprises a frame and at least a rotor connected thereto for providing lift. Solar cells are arranged on the frame and/or the rotor for exploiting solar energy and the rotor is so arranged that it enables the exploitation of wind energy. It is an idea of a preferred embodiment that the frame is convex.

It is an advantage of the invention that the aircraft, being adapted for moving and accommodation purposes, is extremely versatile. Solar energy can be exploited by means of the solar cells. When a rotor blade is so arranged that the device is also able to exploit wind energy, the amount of fuel used for flying and accommodation purposes can be considerably reduced and, most preferably, no external fuel is required. The efficiency and flying characteristics of the aircraft can be optimized by making the frame convex.

BRIEF DESCRIPTION OF THE DRAWINGS

The invention will be described in more detail in the accompanying drawings, in which.

DESCRIPTION OF THE PREFERRED EMBODIMENTS

Figure 1:
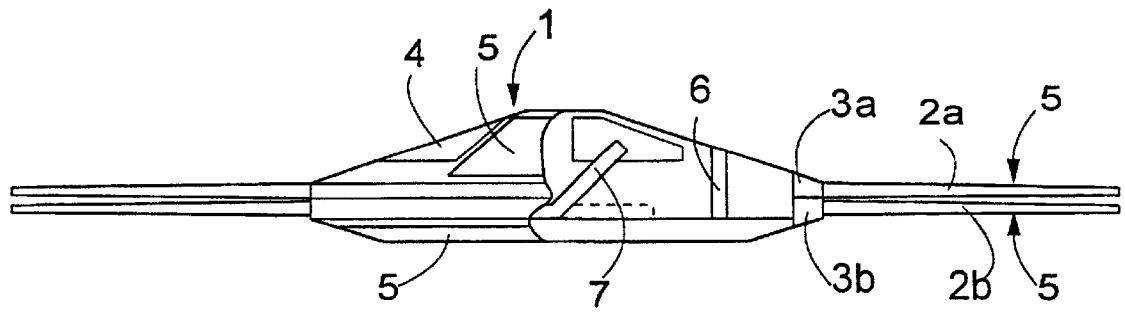
FIG. 1 is a schematic partial cross sectional side view of an aircraft of the invention.

FIG. 1 shows an aircraft comprising a frame 1 having on its outer circumference rotor rims 3a and 3b which are rotatable in opposite directions and to which rotors 2a and 2b are connected. In this application, the term rotor also refers to a rotating blade that provides lift.

The frame 1 also comprises windows 4 and solar cells 5 which are also arranged on the frame 1 for recovering solar energy. The bottom part of the frame 1 can be raised or lowered by lifting means 6. Alternatively, if the bottom part is fixedly fastened and the top part is detached, the top part of the frame 1 can be raised or lowered by the same lifting means 6. Seats 7 can be moved forward and backward for adjusting the centre of gravity of the apparatus. The backs of the seats 7 can be reclined into a horizontal position in the manner shown by a dashed line in FIG. 1, i.e. the aircraft provides a means for accommodation purposes.

Figure 2:
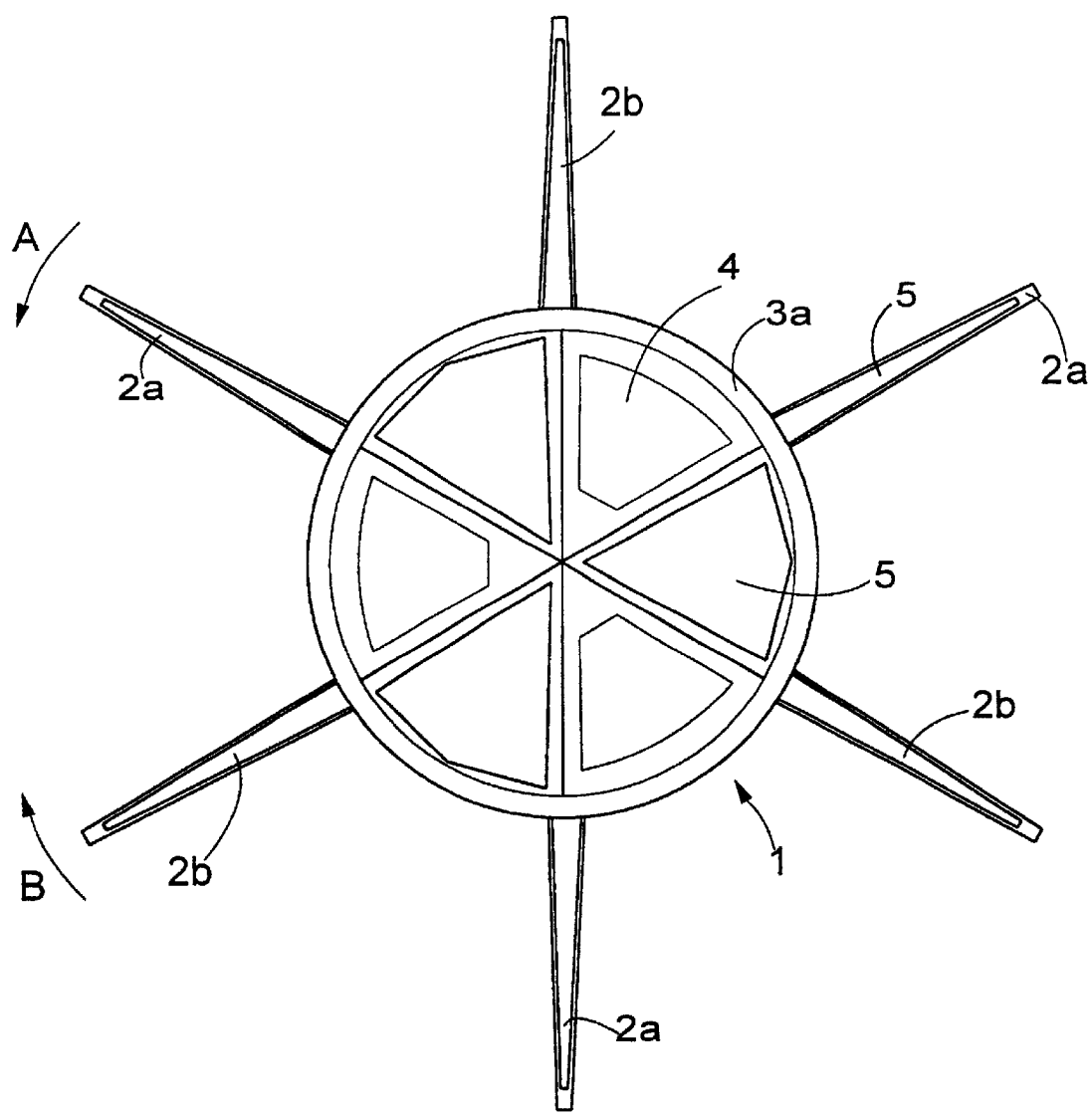
FIG. 2 is a top view of the aircraft of FIG. 1.

FIG. 2 is a top view of the aircraft. The rotors 2a and 2b rotate in opposite directions in the manner shown by arrows A and B. Some of the solar cells 5 can also be arranged on the rotors 2a and 2b. The size of the apparatus can naturally vary according to the purpose of use and number of passengers. The frame 1 of a two-seater apparatus may be 3 m in diameter, for example, and the rotor blades may be about 3 m in length. Each rotor rim 3a and 3b may have 3 to 5 blades, for example. The solar cells 5 may then have a surface area of about 15 $m^2$, and they generate a power of about 1 kW. Batteries may weigh about 10 kg and they can generate a power of about 2.5 kW for 2 minutes. The empty weight of the apparatus can then be about 100 to 150 kg. For increasing the power it is advantageous to also place some of the solar cells 5 on the bottom surfaces of the frame 1 and the rotors 2a and 2b, which makes it possible to utilize radiation reflected from the clouds, for example, when the aircraft flies above the clouds.

Figure 3:
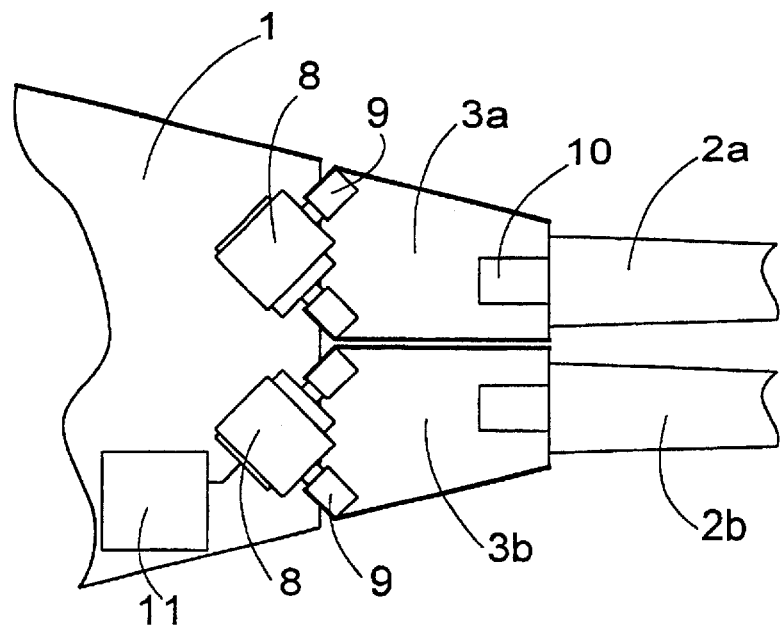
FIG. 3 is a cross sectional side view of a part of the aircraft of FIG. 1.

FIG. 3 presents a rotating mechanism of the rotors 2a and 2b. The rotating mechanism comprises electric motors 8 which use rolls 9 to counter rotate the rotor rims 3a and 3b and the rotors 2a and 2b connected thereto. The electric motors 8 get their driving power from batteries 11. Means 10 for adjusting the blade angle of the rotor are arranged in connection with the rotors 2a and 2b. The blade angle of the rotors can be adjusted by the means 10 so as to make the wind rotate the rotors 2a and 2b when the aircraft is substantially stationary, for example. When permanent magnet motors, for example, are used as the electric motors 8, they can be arranged to function as generators which charge the batteries 11 while the wind is rotating the rotors 2a and 2b.

Take-off is preferably accomplished by setting the blade angles of the rotors 2a and 2b to zero and speeding up the rotors 2a and 2b to a speed about twice as high as the normal speed of rotation, after which the blade angle is increased, allowing the motion energy stored in the rotors 2a and 2b and in the rotor rims 3a and 3b to be used for take-off. The energy stored in the batteries 11 can also be used during take-off. Naturally, solar energy collected by the solar cells 5 can also be exploited in every situation. The aircraft can also use turbulence of the airflow for providing lift. In that case, the angles of the slowly rotating rotor blades are adjusted according to the directions of the airflow so as to provide the maximum lift. Wind energy can also be recovered from turbulence while the aircraft is moving by suitably adjusting the blades of the rotors 2a and 2b. The blade angles are optimized by independent adjustment controllers which adjust each blade individually. The aircraft is controlled by adjusting the torque of the rotors 2a and 2b with respect to the frame 1, enabling the frame 1 to be turned in the desired direction. The speed of motion is controlled by adjusting the centre of gravity and the blade angles of the rotors 2a and 2b.

Figure 4:
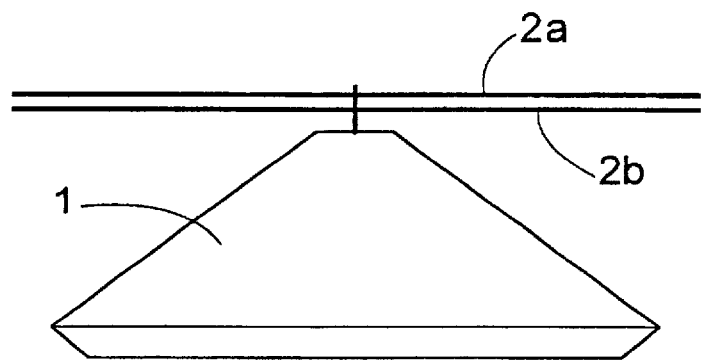
FIG. 4 is a schematic side view of a second aircraft of the invention.

The frame 1 is preferably convex, i.e. the surface area of the upper part is larger than that of the bottom part. This provides very good efficiency and flying and gliding characteristics. Likewise, the long and slowly rotating rotors 2a and 2b improve these characteristics and provide a good flying stability by the gyroscopic force generated by the rotors 2a and 2b. The conical structure presented in FIG. 4 is particularly advantageous for gliding and flying characteristics. In the solution of FIG. 4, the rotors 2a and 2b are positioned one on the other above the frame 1, thereby providing a simple aircraft structure.

Figure 5:
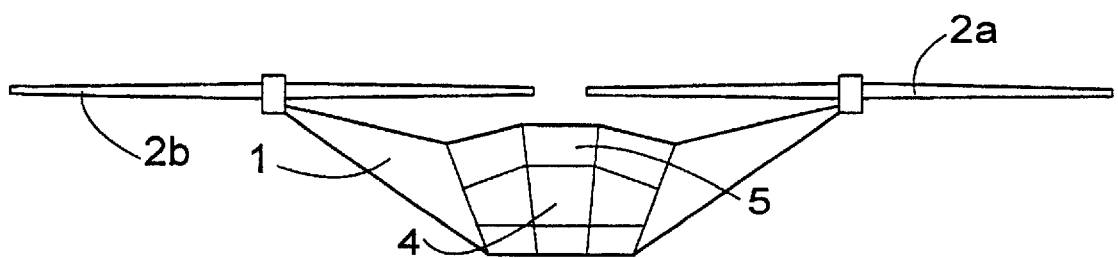
FIG. 5 is a schematic front view of a third aircraft of the invention.
Figure 6:
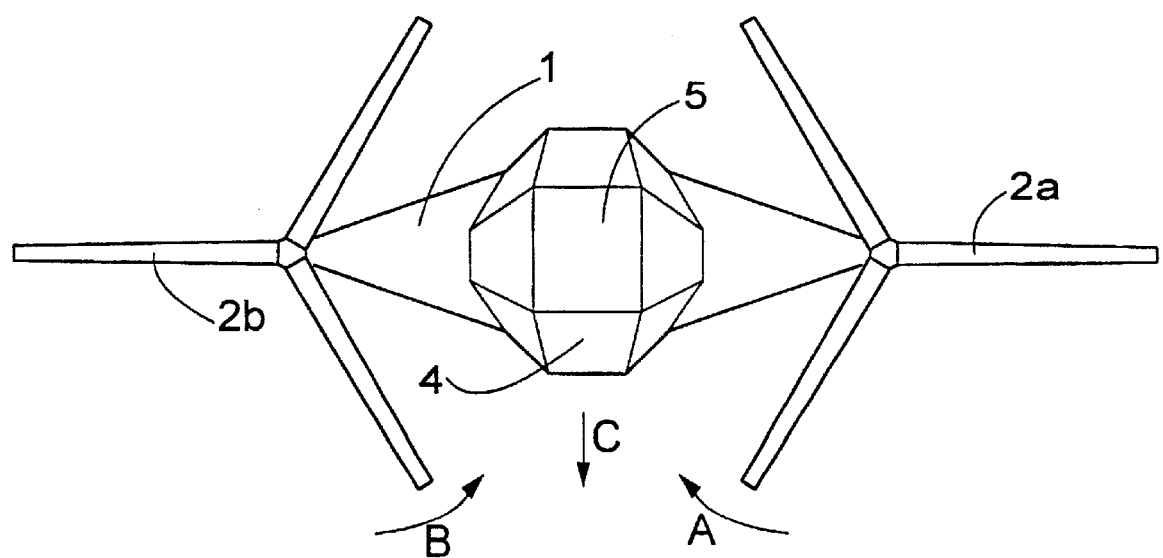
FIG. 6 is a top view of the aircraft of FIG. 5.

FIG. 5 is a front view of a third aircraft of the invention, and FIG. 6 is a top view of a corresponding aircraft. In this solution, the rotors 2a and 2b are positioned substantially side by side. In that case, the aircraft can be controlled and manoeuvred in a very versatile manner. When the aircraft flies in the direction of arrow C, the rotors 2a and 2b rotate in opposite directions in accordance with arrows A and B in the manner presented in FIG. 6.

The drawings and the related description are only intended to illustrate the idea of the invention. The details of the invention may vary within the scope of the claims. Naturally, electric energy generated from the sun and the wind by the aircraft can also be used for activities associated with accommodation in the aircraft, or electricity can be supplied to an electrical network. A fuel cell can also be used as a source of energy. The aircraft can also be so constructed that it is able to float, which enables it to land and move on water. Wind energy can also be easily recovered and exploited while the aircraft is floating on water.

What is claimed is:

1. An aircraft comprising:
   a conical asymmetrical frame, said frame having a maximum cross-sectional chord defining an upper part and a bottom part, a surface area of said upper part being larger than a surface area of said bottom part;
   at least one rotor connected to said frame for providing lift for said aircraft;
   a passenger cabin within said frame, said passenger cabin having means for accommodation purposes;
   solar cells mounted on said aircraft for exploiting solar energy; and
   wind energy exploitation controllers connected to said at least one rotor.

2. The aircraft as claimed in claim 1 wherein at least one of said solar cells is attached to said frame.

3. The aircraft as claimed in claim 2 wherein at least one of said solar cells is attached to said bottom part of said frame.

4. The aircraft as claimed in claim 1 wherein at least one of said solar cells is attached to said at least one rotor.

5. The aircraft as claimed in claim 1 wherein said at least one rotor is located above said frame.

6. The aircraft as claimed in claim 1 further comprising:
   a rotating rotor rim on an outer circumference of said frame, said rotor being attached to said rotating rotor rim.

7. The aircraft as claimed in claim 1 further comprising:
   at least two rotors, wherein said at least two rotors are configured to rotate in opposite directions.

8. The aircraft as claimed in claim 7 wherein said at least two rotors are configured side by side.

9. The aircraft as claimed in claim 1 further comprising:
   batteries arranged within said frame for storing solar energy and wind energy.

* * * * *